United States Patent [19]

Winchester

[11] Patent Number: 4,724,953
[45] Date of Patent: Feb. 16, 1988

[54] FOOD CONVEYOR APPARATUS

[76] Inventor: Donald M. Winchester, Route 2, Box 398, Kaufman, Tex. 75142

[21] Appl. No.: 918,923

[22] Filed: Oct. 15, 1986

[51] Int. Cl.$^4$ .............................................. B65G 21/20
[52] U.S. Cl. ..................................... 198/836; 198/837; 198/841; 198/860.1
[58] Field of Search ............ 198/841, 836, 837, 860.1, 198/861.1, 494, 840, 689.1; 209/380; 271/197

[56] References Cited

U.S. PATENT DOCUMENTS

| | | | |
|---|---|---|---|
| 1,401,366 | 12/1921 | Sargent | 198/841 |
| 2,523,562 | 9/1950 | Eakin et al. | 198/836 X |
| 2,922,512 | 1/1960 | Lo Presti | 198/837 X |
| 3,080,079 | 3/1963 | Lecrone et al. | 198/689.1 |
| 3,764,024 | 10/1973 | Mojden | 198/689.1 X |
| 3,820,650 | 6/1974 | Garvey | 198/860.1 |
| 3,850,088 | 11/1974 | Tobey et al. | 198/689.1 X |
| 4,344,526 | 8/1982 | Quarella | 198/841 X |
| 4,518,303 | 5/1985 | Moser | 198/841 X |

FOREIGN PATENT DOCUMENTS

| | | | |
|---|---|---|---|
| 280078 | 1/1952 | Switzerland | 198/836 |
| 1094811 | 5/1984 | U.S.S.R. | 198/689.1 |

Primary Examiner—Robert J. Spar
Assistant Examiner—Cheryl L. Gastineau
Attorney, Agent, or Firm—Michael A. O'Neil

[57] ABSTRACT

A food conveyor apparatus includes a frame, a cross support structure, and a platform. A plurality of rows of oblong holes are cut along the lengths of the platform, each row being offset from the adjacent rows of holes. The platform supports an endless mesh conveyor belt and containment clips mounted along the edges of the platform hold the conveyor belt on the platform. A plurality of vertical tubular supports are secured between the bottom of the platform and a plurality of horizontal tubular supports that extend across the width of the platform between the frame struts. A sideboard is mounted to the frame struts and positioned above the edges of the conveyor belt along the length of the platform.

18 Claims, 6 Drawing Figures

FOOD CONVEYOR APPARATUS

TECHNICAL FIELD

This invention relates to conveying devices and more particularly to an easily cleaned conveyor platform and mechanism for conveying food products.

BACKGROUND OF THE INVENTION

Conveyors for food products often comprise a frame, a conveyor platform, a motor, and an endless conveyor belt. The motor pulls the conveyor belt across the top of the platform to transport the food products. The belt then turns below the platform to drop the food products and return to the other end of the platform. Because it is important that the food be free of excess grease, dirt and crumbs, the conveyor belt and conveyor platform have holes to permit debris to fall through the endless conveyor belt and the platform and into a collection pan under the frame.

Referring now to FIGS. 1 and 2, one type of prior conveyor support apparatus 10 was constructed with angle irons 14 and 16 along the length of a conveyor frame 18 and a single flat central bar 22 of metal down the center of the conveyor frame 18. Ribs 30 of sheet metal were welded to the angle irons 14 and 16 and the central bar 22 in a herringbone pattern. The angle irons 14 and 16, central bar 22 and ribs 30 formed a conveyor platform to support a conveyor belt 26 as it moved down the length of the conveyor apparatus 10. Sideboards 34 and 36 were mounted directly above the edges of the conveyor belt 26 to keep the food on the belt. Cross supports 40 of channel iron or angle iron beneath the conveyor platform braced the frame 18.

Unfortunately, the prior apparatus shown in FIGS. 1 and 2 has several problems. For instance, the central bar 22 caused a "dead" spot along the center of the conveyor belt, and the horizontal flanges of the angle irons 14 and 16 caused "dead" spots along the edges of the belt. This resulted in uneven wear along the bottom of the conveyor belt and premature destruction of the conveyor belt.

The "dead" spots and the joints between the sheet metal ribs 30 and the central bar 22 and angle irons 14 and 16 were often easily filled with debris and grease and were difficult to clean. The parallelogram-shaped holes in the herringbone pattern of the conveyor platform permitted food and debris to fall through the conveyor belt 26 and the platform onto the flat faces of the cross supports 40. Accumulation of food and debris presented a significant sanitation problem.

This prior type of conveyor was also difficult if not impossible to clean. The overhead sideboards 34 and 36 and the vertical flanges of the angle irons 14 and 16 prevented food from falling off the edges of the conveyor belt but also made it difficult or impossible for workers to reach under the edges of the belt 26 and to clean the angle irons 14 and 16, the ribs 30, and the joints. Obviously, inability to clean any surfaces cannot be tolerated in a food processing environment.

The many welds made to join the sheet metal ribs 30, the central bar 22 and angle irons 14 and 16 had to be polished to prevent the belt from becoming stuck on the jagged edges and to eliminate sanitation problem areas. The platform was therefore difficult and costly to manufacture. Thus, there were many significant sanitation problems with the prior conveyor apparatus platforms.

SUMMARY OF THE INVENTION

According to the present invention, a food conveyor apparatus is provided that eliminates these and other problems of the prior devices. The conveyor apparatus according to the present invention is easily and cheaply manufactured, is easily cleaned and does not have "dead" spots or problem areas for accumulation of debris.

The present conveyor apparatus has a plastic or sheet metal platform to support the conveyor belt. A plurality of rows of oblong holes are cut across the width of the platform along the length of the platform. The holes of each row are laterally offset from the holes of adjacent rows to form a network of areas through which debris may fall. The holes are simply cut into the platform and the edges of the platform are secured to the lengthwise struts of the apparatus frame. Thus the cost of manufacturing the platform is greatly reduced.

A plurality of containment clips are fixed near the edges of the platform to hold the conveyor belt on the platform. The containment clips comprise small, angled pieces of plastic or metal, the angled portion of the containment clips being directed to move the conveyor belt toward the center of the platform. The sideboards are hinged to allow rotation away from the conveyor belt. Because the containment clips do not run along the entire length of the sheet metal platform, there are no vertical flanges obstructing the workers cleaning under the conveyor belt. The holes and the containment clips eliminate areas in which debris may accumulate and provide a conveyor apparatus that is easily cleaned.

A plurality of horizontal tubular supports extending between the sides of the frame are secured to the platform by a plurality of vertical tubular supports fixed between the horizontal tubular supports and the bottom face of the platform. The tubular supports are mounted beneath the platform between rows of holes and thus do not present problem areas for accumulation of debris. This construction is easily obtained from inexpensive, readily available tubing. Therefore, the present invention provides a food conveyor with significant advantages over prior food conveyors and yet having a less expensive construction.

BRIEF DESCRIPTION OF THE DRAWINGS

For a more complete understanding of the present invention and for further advantages thereof, reference is now made to the following Detailed Description taken in conjunction with the accompanying Drawings, in which:

FIG. 6 shows a top view of an alternate embodiment of the invention.

DETAILED DESCRIPTION

Figure 1:
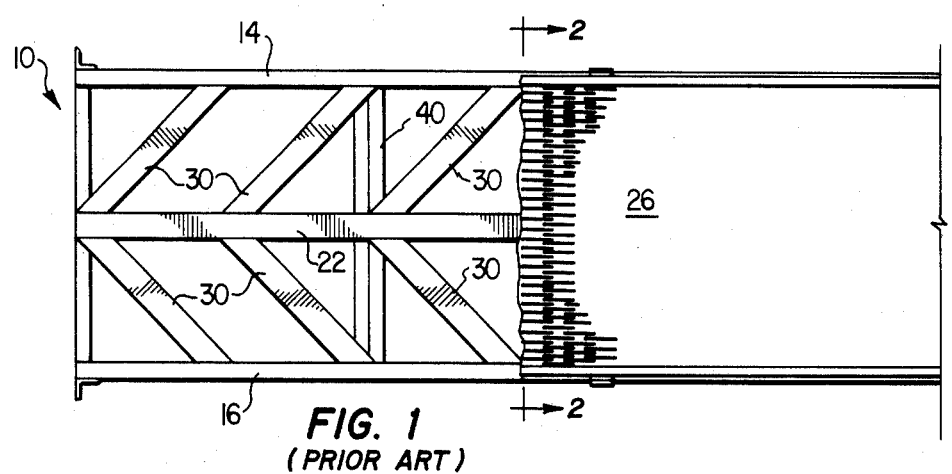
FIG. 1 shows a top view of a prior conveyor apparatus.
Figure 2:
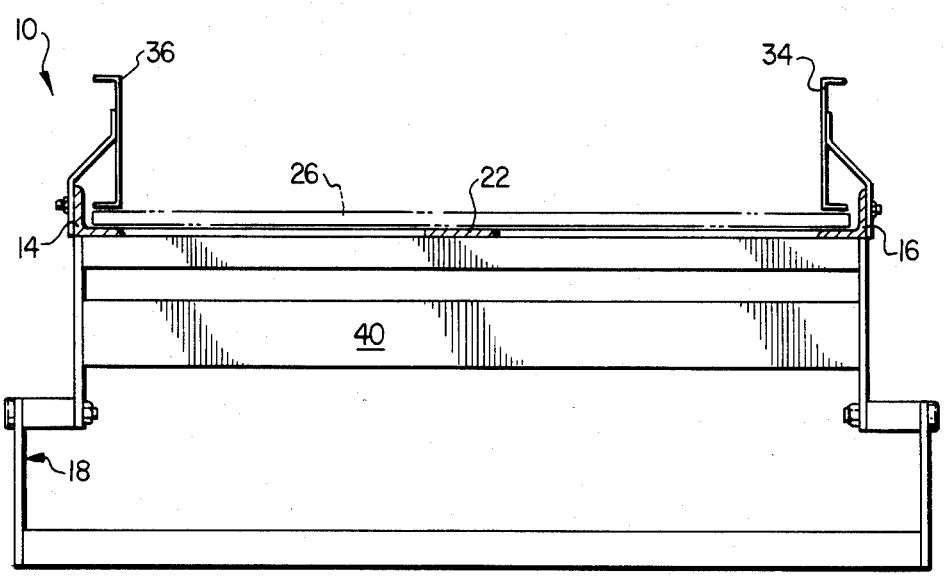
FIG. 2 shows a side view of a prior conveyor apparatus.
Figure 3:
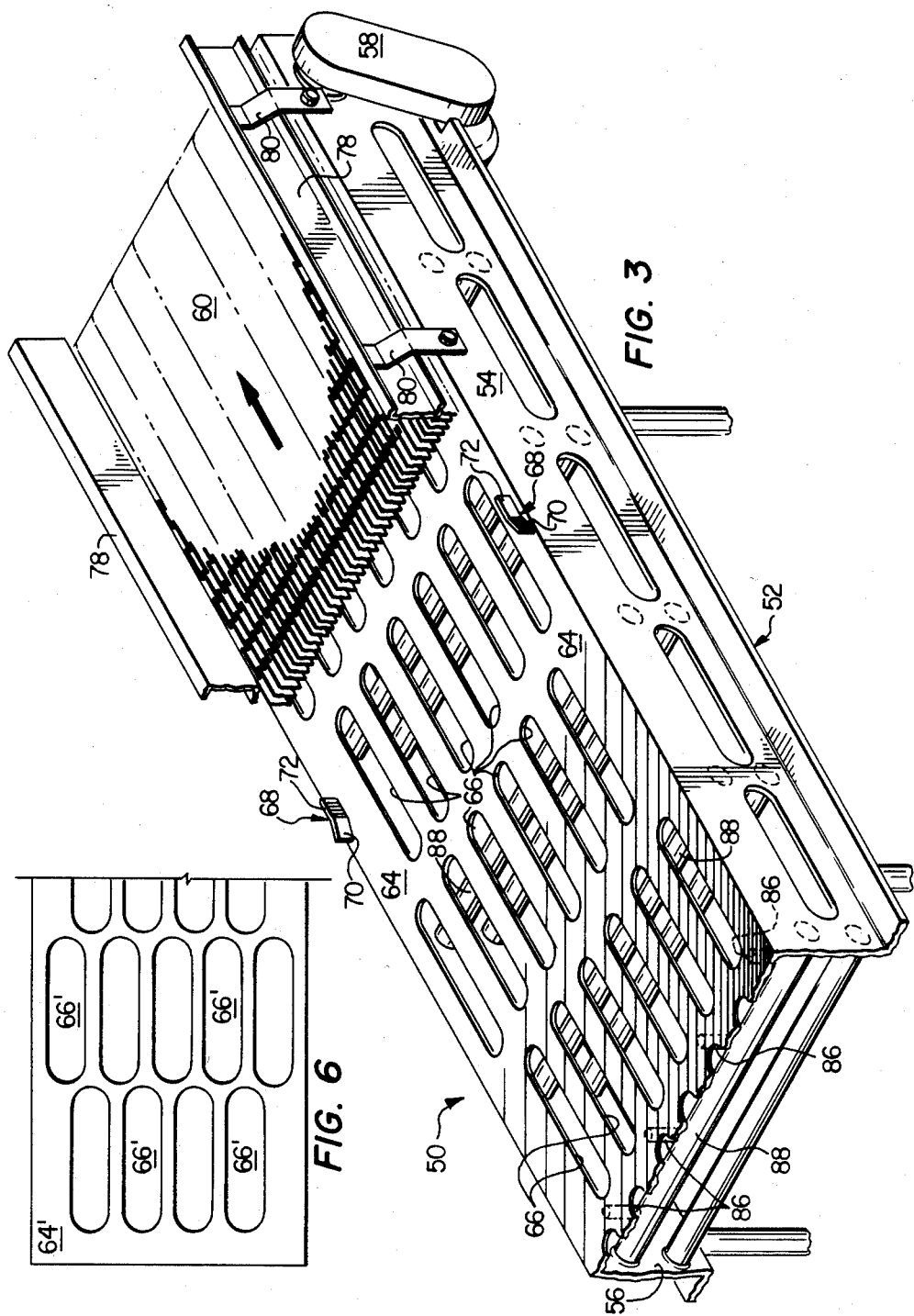
FIG. 3 shows a top perspective view of the conveyor apparatus according to the present invention.

Referring now to the drawings and more particularly to FIG. 3 thereof, there is shown a food conveyor apparatus 50 according to the instant invention. The food conveyor apparatus 50 comprises a frame 52 having opposing longitudinal struts 54 and 56 on which is mounted a motor and drive system 58 to drive a conveyor belt 60. A platform 64 having a plurality of oblong holes 66 is secured to the struts 54 and 56 along the longitudinal axis of the frame 52 to support the conveyor belt 60. A plurality of containment clips 68 having an angled face 70 and a parallel face 72 are fixed on opposing edges of the platform 64 to hold the conveyor belt 60 on the platform 64. A pair of sideboards 78 extending along the entire length of the conveyor belt 60 are attached above the edges of the conveyor belt 60 by a plurality of flanges 80. In FIG. 3, the conveyor belt 60 and the sideboards 78 are cut away to disclose the platform 64 and the underlying structures.

To support the platform 64, a plurality of vertical tubular supports 86 (shown in dotted lines in FIG. 3) are attached between the bottom of the support 64 and a plurality of horizontal tubular supports 88 that extend between the opposing struts 54 and 56 of the frame 52. The vertical supports 86 and horizontal supports 88 are mounted underneath the solid areas of the platform 64 that exist between the rows of oblong holes 66. In this way the horizontal supports 88 are not subjected to a significant amount of debris and food falling through the oblong holes 66 and thus the horizontal supports 88 are kept much cleaner than in prior devices. Use of cylindrical vertical supports 86 and horizontal supports 88 eliminates flat surfaces and further reduces accumulation of debris.

Figure 4:
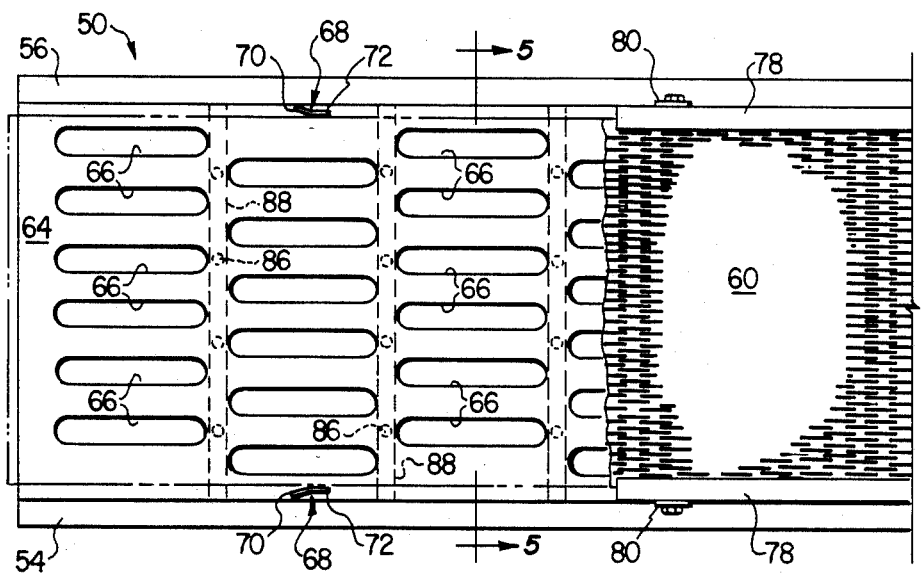
FIG. 4 shows a top view of the conveyor apparatus of FIG. 3.

Referring now to FIG. 4, a top view of the food conveyor apparatus 50 is shown with the sideboards 78 and the conveyor belt 60 cut away to disclose the structure of the conveyor apparatus beneath those components. The vertical supports 86 and horizontal supports 88 are shown in dashed lines in FIG. 4.

The oblong holes 66 are formed in a plurality of rows along the length of the platform 64. Each row of holes 66 is offset from the two adjacent rows. Because adjacent rows of oblong holes 66 are offset from each other, there are openings along the entire length of the platform 64 and across the entire width of the platform 64 to permit food and debris to fall through the platform 64. Thus, the "dead" areas inherent in prior devices are eliminated.

In the embodiment shown in FIGS. 3 and 4, the width of the oblong holes 66 in adjacent rows is approximately equal to the width of the solid areas between the holes 66 of the adjacent rows and each row of holes 66 runs perpendicular to the longitudinal axis of the frame 52 and the platform 64. In an alternate embodiment of the invention as shown in FIG. 6, the width of the holes 66 is substantially greater than the distance between the holes of the immediately adjacent rows and thus the width of the holes in the adjacent rows significantly overlaps, thereby enlarging the area through which debris may fall. In another embodiment, the rows of holes 66 are aligned at an angle that is not perpendicular to the longitudinal axis of the frame 52 and the platform 64.

Figure 5:
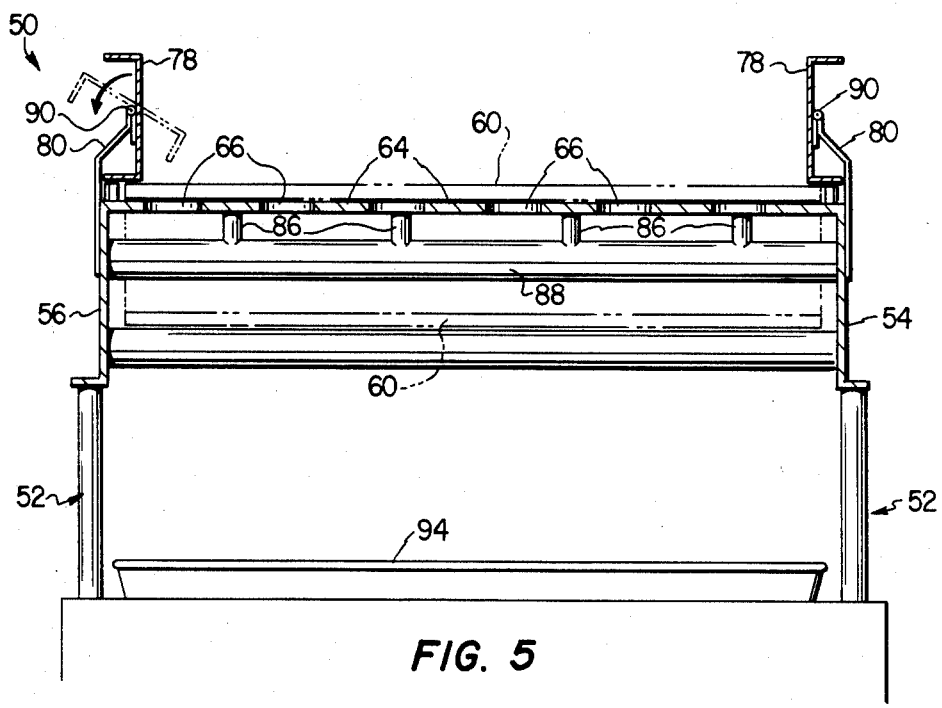
FIG. 5 shows a side view of the conveyor apparatus taken along the line 5—5 of FIG. 4.

Referring now to FIG. 5, a side view of the conveyor apparatus 50 taken along the line 5—5 of FIG. 4 is shown. Hinges 90 allow rotation of the sideboards 78 away from the conveyor belt 60. Workers may then clean the metal areas beneath the conveyor belt 60. A debris pan 94 beneath the frame 52 of the conveyor apparatus 50 collects debris falling through the conveyor belt 60 and the oblong holes 66. The conveyor belt 60 moves both above and below the platform 64 and tubular supports 86 and 88.

The conveyor belt 60 may be an endless, plastic mesh chain-link conveyor belt as is known in the art. Debris and particulate food matter fall through the conveyor belt 60 and the oblong holes 66 into the debris pan 94. The platform 64 is a length of sheet metal or plastic with oblong holes 66 cut therein. The containment clips 68 are small pieces of metal or plastic that are welded, glued or otherwise secured to the top face of the platform 64. The welds are polished to prevent wear on the conveyor belt 60 and to eliminate sanitation problem areas.

The sideboards 78 may comprise lengths of channel iron or other material. The horizontal tubular support 88 is a metal or plastic tube that is attached to the struts 54 and 56. The vertical tubular supports 86 are small metal or plastic tubes that are welded or fixed to the bottom of the platform 64 and to the horizontal tubular support 88. The flanges 80 and hinges 90 may be formed of sheet metal or plastic or other materials as is known in the art. The frame 52 and motor 58 are any of those known in the art.

In operation, the motor 58 moves the conveyor belt 60 across the platform 64 in the direction of the arrow shown in FIG. 3. Food products on the conveyor belt 60 are thereby carried along the length of the conveyor apparatus 50 to be deposited at one end thereof. The sideboards 78 prevent food from falling over the edge of the conveyor belt 60. The containment clips 68 hold the conveyor belt 60 in position over the platform 64. The angled faces 70 of the containment clips 68 cause the conveyor belt 60 to move towards the center of the platform 64 and the parallel faces 72 hold the conveyor belt 60 in a line parallel to the direction of movement of conveyor belt 60 over the platform 64. Grease and debris falls through the mesh conveyor belt 60 and the oblong holes 66 and into the debris pan 94. The solid strips of material between the rows of holes in the platform 64 protect the horizontal tubular supports 88 and the vertical tubular supports 86 from significant accumulation of grease or debris.

To clean the conveyor platform 64, the sideboards 78 are rotated out of the way as shown in FIG. 5 using the hinges 90. Workers may then lift the conveyor belt 60 and clean the platform 64. The containment clips 68 do not obstruct this cleaning. The conveyor belt 60 is then set back onto the platform 64, the sideboards 78 are rotated back into position and the conveyor apparatus 50 is ready for further operation.

Although preferred embodiments of the invention have been illustrated in the accompanying Drawings and described in the foregoing Detailed Description, it will be understood that the invention is not limited to the embodiments disclosed, but is intended to embrace any alternatives, modifications, and rearrangements and/or substitutions of parts or elements as fall within the spirit and scope of the invention.

I claim:

1. A food conveyor apparatus comprising:
   a frame having a longitudinal axis;
   a platform secured to the frame along the longitudinal axis of said frame, said platform having a plurality of rows of oblong holes longitudinally spaced along the length thereof, each row of holes being formed laterally across the width of the platform and the holes of each row being laterally offset from the holes of the adjacent rows;

a plurality of solid platform areas across the entire width of the platform between the longitudinally spaced rows of oblong holes;

a conveyor belt positioned to move in a predetermined direction along the longitudinal axis of the frame; and means for moving the conveyor belt over the platform;

wherein the holes in the platform permit debris to fall through the platform.

2. The apparatus of claim 1 further comprising a plurality of containment of clips proximate each longitudinal edge of the platform and spaced along the length of the platform.

3. The apparatus of claim 2 wherein the containment clips have a first portion and a second portion, said first portion being aligned parallel to the longitudinal axis of the frame and the direction of movement of the conveyor belt and said second portion being formed at an angle to the longitudinal axis of the frame and the direction of movement of the conveyor belt to maintain the conveyor belt on the platform.

4. The apparatus of claim 1 wherein the platform is secured to the frame by means comprising:

a plurality of horizontal tubular supports secured to the frame; and a plurality of vertical tubular supports secured between the horizontal tubular supports and the platform.

5. The apparatus of claim 4 wherein the horizontal tubular supports and vertical tubular supports are secured directly beneath the solid platform areas.

6. The apparatus of claim 1 further comprising a pair of sideboards mounted to the frame by a plurality of flanges, the sideboards being positioned above opposing longitudinal edges of the conveyor belt.

7. The food conveyor apparatus of claim 1 wherein the width of each oblong hole in any one row is approximately equal to the lateral distance between holes in the immediately adjacent rows of holes.

8. The food conveyor apparatus of claim 1 wherein the width of each oblong hole in any given row is substantially greater than the lateral distance between the holes in the immediately adjacent rows of holes.

9. A food conveyor comprising:

a frame having a longitudinal axis and struts parallel to the longitudinal axis on opposing sides of the frame;

a platform mounted to the frame struts along the longitudinal axis of the frame, said platform having a top face, a bottom face and a plurality of rows of oblong holes along the length thereof, each row of holes being formed across the width of the platform, the holes of each row being laterally offset from the holes of the adjacent rows, the rows of holes thereby forming a network of areas through which debris may fall;

a plurality of solid platform areas across the width of the platform between the rows of holes;

an endless mesh conveyor belt positioned on the top face of the platform along the longitudinal axis of the frame to move across the top face of the platform in a predetermined direction;

means for moving the conveyor belt over the platform; and a plurality of containment clips proximately spaced along each longitudinal edge of the platform to hold the belt on the top face of the platform;

wherein the holes allow debris to fall through the platform and wherein the containment clips permit the conveyor belt to be lifted along its longitudinal edges so that the platform may be cleaned beneath the belt.

10. The apparatus of claim 9 wherein the platform is secured to the frame by means comprising:

a plurality of horizontal tubular supports secured between opposing struts of the frame; and a plurality of vertical tubular supports secured between each horizontal tubular support and the bottom face of the platform.

11. The apparatus of claim 10 wherein the horizontal tubular supports are secured to the opposing sides of the frame directly beneath the solid platform areas extending across the width of the platform between the rows of holes.

12. The apparatus of claim 9 wherein said containment clips have a first portion and a second portion, said first portion being aligned parallel with the longitudinal axis of the frame and said second portion being formed at an angle to the longitudinal axis of the frame to maintain the conveyor belt on the platform.

13. The apparatus of claim 9 further comprising a pair of sideboards rotatably mounted to the frame struts by a plurality of flanges and hinges, each of said sideboards positioned above opposing longitudinal edges of the conveyor belt.

14. The food conveyor apparatus of claim 9 wherein the width of each oblong hole in any one row is approximately equal to the lateral distance between holes in the immediately adjacent rows of holes.

15. The food conveyor apparatus of claim 9 wherein the width of each oblong hole in any given row is substantially greater than the lateral distance between the holes in the immediately adjacent rows of holes.

16. A food conveyor apparatus comprising:

a frame having a longitudinal axis and struts parallel to the longitudinal axis down opposing sides of the frame;

a platform mounted to the frame struts along the longitudinal axis of the frame, said platform having a top face, a bottom face and a plurality of oblong holes along the length thereof, said holes being formed laterally across the width of the platform in a plurality of rows, the holes of each row being laterally offset from the holes of the adjacent rows, the rows of holes thereby forming a network of areas through which debris may fall and wherein the rows of holes and the platform form a plurality of solid platform areas across the width of the platform between the rows of holes;

an endless mesh conveyor belt positioned on the top face of the platform to move longitudinally along the length of the platform in a predetermined direction and return beneath the platform in the opposite direction;

means for moving the conveyor belt over the platform;

a plurality of containment clips longitudinally spaced proximate both edges along the platform, said containment clips having a first portion and a second portion, said first portion being aligned parallel with the longitudinal axis of the frame and the direction of movement of the conveyor belt and said second portion being formed at an angle to the longitudinal axis of the frame to maintain the conveyor belt on the platform;

a pair of longitudinal sideboards rotatably hinged to the frame struts by a plurality of flanges, each sideboard positioned above one of the edges of the conveyor belt along the length of the platform; and means for supporting the platform on the frame comprising:

a plurality of horizontal tubular supports extending across the width of the platform between the frame struts and secured to the opposing sides of the frame struts directly beneath the solid platform areas, the horizontal tubular supports thereby extending across the width of the platform between the rows of holes; and a plurality of vertical tubular supports secured between the horizontal tubular supports and the bottom face of the platform;

wherein the holes in the platform permit easy and inexpensive manufacture of the platform to permit debris to fall through the conveyor belt and below the support and wherein the containment clips permit cleaning beneath the conveyor belt.

17. The food conveyor apparatus of claim 16 wherein the width of each oblong hole in any one row is approximately equal to the lateral distance between holes in the immediately adjacent rows of holes.

18. The food conveyor apparatus of claim 16 wherein the width of each oblong hole in any given row is substantially greater than the lateral distance between the holes in the immediately adjacent rows of holes.

* * * * *